Feb. 25, 1930.  M. S. FURMAN  1,748,566
TOY VEHICLE FRAME
Filed March 12, 1929  2 Sheets-Sheet 1
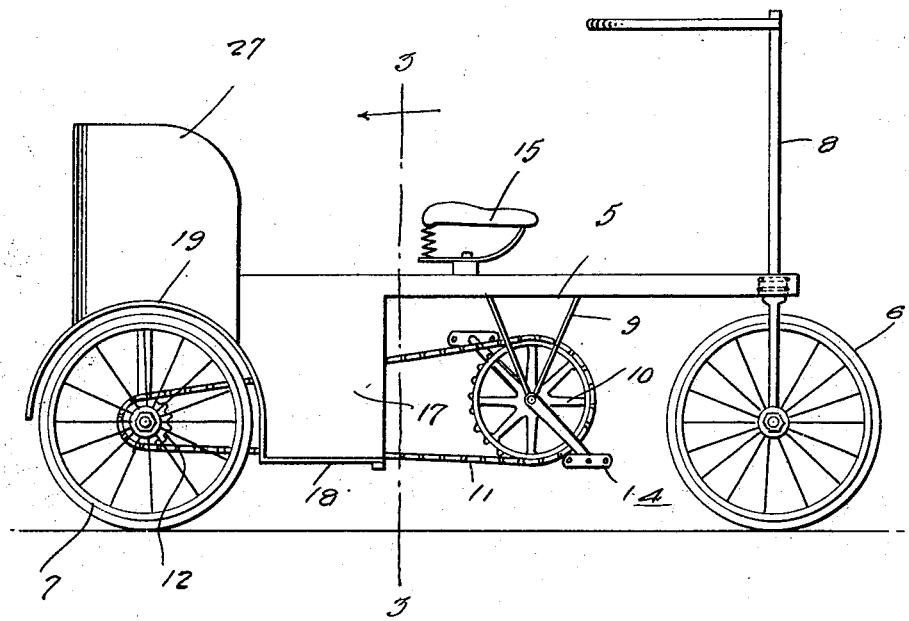
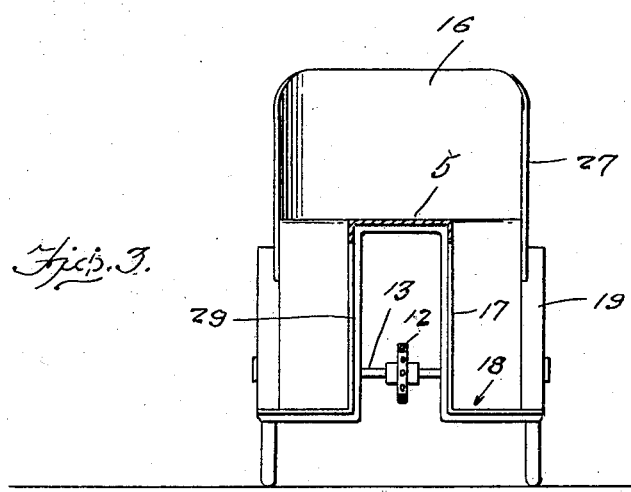
Inventor
M. S. Furman
By Clarence A. O'Brien
Attorney Feb. 25, 1930.     M. S. FURMAN     1,748,566
TOY VEHICLE FRAME
Filed March 12, 1929     2 Sheets-Sheet 2
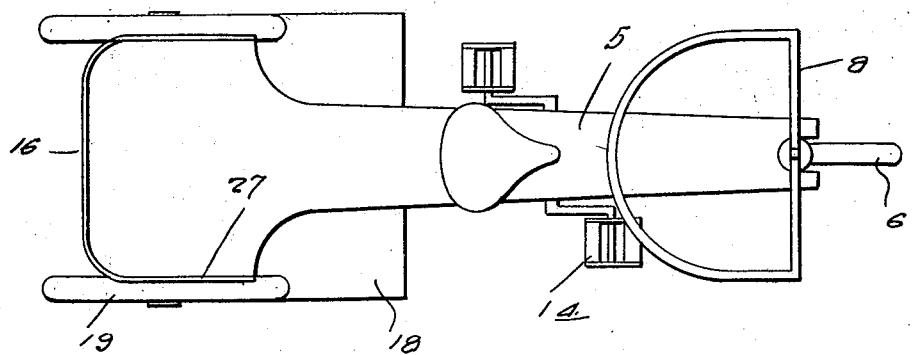
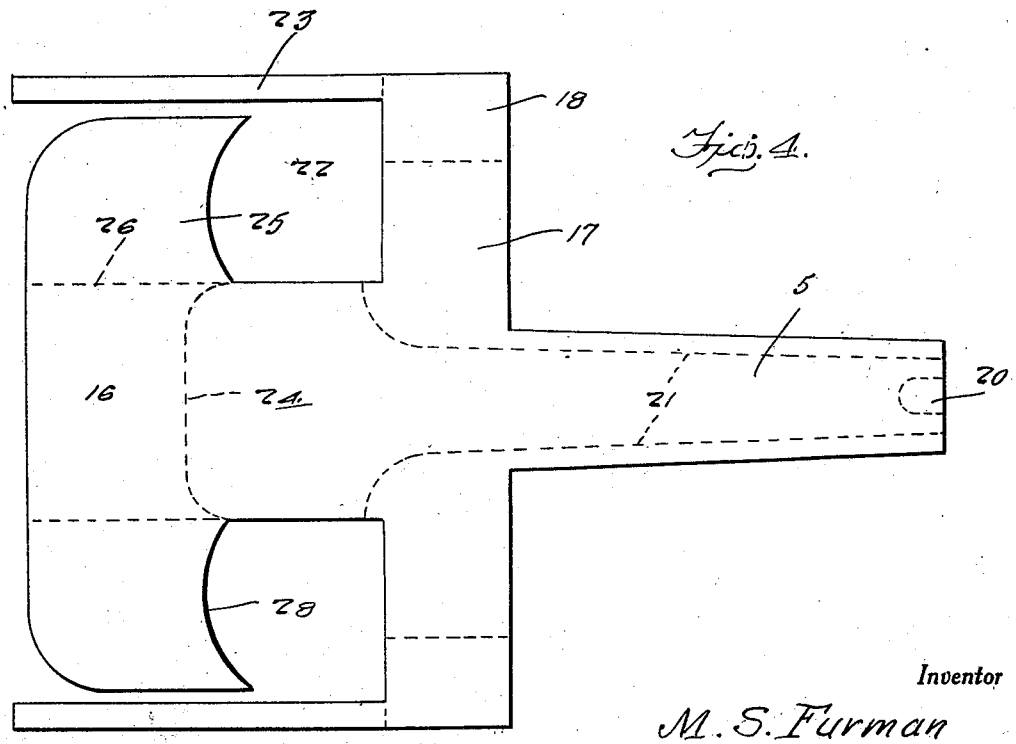
Inventor
M. S. Furman
By *Clarence A. O'Brien*
Attorney Patented Feb. 25, 1930

1,748,566

UNITED STATES PATENT OFFICE

MAXWELL STEELE FURMAN, OF MORGANTOWN, WEST VIRGINIA

TOY VEHICLE FRAME

Application filed March 12, 1929. Serial No. 346,379.

The present invention relates to toy vehicles and more particularly to velocipedes and the like embodying pedalling means for driving the vehicle and has for its principal object to provide a novel frame construction therefor.

A further object of the invention is to provide a vehicle frame of this character which embodies a frame for mounting the wheels of the vehicle at the opposite end thereof together with a back rest, foot rest and chain guard for a passenger carried by the vehicle and which are constructed integrally from a single sheet of metal together with said frame.

A still further object is to provide an article of this character of a simple and practical construction which is strong and durable, neat and attractive in appearance, which enables the parts entering into the construction of the vehicle to be reduced to a minimum and at the same time enables the construction of the toy at a relatively low cost.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a side elevational view,

Figure 2 is a top plan view,

Figure 3 is a vertical transverse sectional view taken substantially along a line 3—3 of Figure 1, and Figure 4 is a plan view of the blank from which the vehicle frame, passenger back rest, foot rest and chain guard are formed.

Referring now to the drawings in detail, wherein for the purpose of illustration I have disclosed a preferred embodiment of the invention, the numeral 5 designates generally the frame of the vehicle having one or more wheels 6 mounted at the forward end thereof and wheels 7 mounted at the rear thereof.

The front wheels 6 are preferably adapted for steering the vehicle through a steering post 8 extending upwardly through the forward end of the frame.

A pair of brackets 9 extend downwardly from the under side of the frame for supporting a sprocket wheel 10 and having a chain 11 trained thereover in operative engagement with the usual sprocket 12 carried by the rear axle 13 for driving the vehicle by means of pedals 14.

A seat 15 is positioned above the frame 5 and substantially intermediate the front and rear ends thereof and within a convenient position for operating the pedals 14.

The rear of the frame 5 is formed into a back rest 16 for a passenger carried at the rear of the vehicle and the sides of the frame, immediately forward of the back rest is formed into a chain guard 17, the bottom edge of the guard being extended laterally at a horizontal plane to form a foot rest 18.

The rear edge of the foot rest extends upwardly and over the rear wheel in spaced relation therefrom to form a mud guard 19. The frame 5, back rest 16, chain guard 17, foot rest 18 and mud guard 19 are formed from a blank of sheet metal, more clearly illustrated in Figure 4 of the drawings. The portion of the blank from which the forward end of the frame 5 is formed, is of a relatively elongated formation having a portion, indicated at 20, cut out for receiving the steering post 8 and arranged with each of its sides bent downwardly along the dotted lines shown at 21 whereby to produce a panel effect at the under side of the frame.

The portion of the blank immediately rearwardly of the elongated section 5 of the frame is bent downwardly at each side to form the chain guard 17 and the outer end of the chain guard section is bent angularly and disposed horizontally whereby to form the foot rest 18.

The portion of the blank immediately rearwardly of the rear edge of the chain guard 17 is cut out in a shape corresponding to the area designated at 22, leaving an elongated strip 23 extending rearwardly from each of the foot rests 18, and which strips are curved over the rear wheels of the vehicle to form mudguards therefor.

A portion of the rear edge of the blank, designated at 16, is bent upwardly along the dotted lines shown at 24 to form the back rest, the cut out section 22 at each side of the blank, leaving wings 25 at each side of the back rest which are adapted to be bent inwardly along the dotted lines as shown at 26 to form upwardly extending sides 27 and constituting substantially arm rests extending forwardly at each side of the back rest.

The forward edge of the wings 25, are concaved, as indicated at 28 whereby upon the folding of the back rest and wings to form the back and arm rest at the rear of the frame, the concaved edge 28 will coincide with and be disposed in close proximity to the mudguards 19.

An angular bracket 29 is positioned beneath the frame for supporting the forward edges of the chain guard 17 and foot rest 18. Where the edges of the mudguard 19, chain guards 17 and arm rests 27 come together, the same may be secured to each other as by spot welding or any other suitable manner well known in the art.

It will be apparent from the foregoing that the vehicle frame constructed in accordance with my invention will prove highly efficient, will simplify the manufacture thereof, will materially lower the cost of manufacture and at the same time will prove strong and durable.

It is obvious that my invention is susceptible to various changes and modifications in construction without departing from the spirit of the invention or the scope of the appended claims, and I accordingly claim all such forms of the device to which I am entitled.

Having thus described my invention, what I claim as new is:

1. A vehicle frame of the class described comprising a wheel supported frame member constructed of a single sheet of metal and including a substantially elongated forwardly extending frame section, chain guards extending downwardly at each side of the frame immediately rearwardly of said elongated section, foot rests formed at the lower edges of said chain guards, mud guards extending rearwardly from said foot rest, a back rest formed at the rear edge of the frame and arm rests extending forwardly of the back rest at opposite sides of the frame and adapted to have their lower edges attached to said mud guard.

2. A vehicle frame of the class described comprising a wheel supported frame member constructed of a single sheet of metal and including a substantially elongated forwardly extending frame section, chain guards extending downwardly at each side of the frame immediately rearwardly of said elongated section, foot rests formed at the lower edges of said chain guards, mud guards extending rearwardly from said foot rest, a back rest formed at the rear edge of the frame, arm rests extending forwardly of the back rest at opposite sides of the frame with their lower edges shaped complemental with the mudguards and adapted for attaching thereto and an angular brace extending transversely of the frame positioned beneath the forward edges of the foot rests and also along the forward edges of said chain guard whereby to reinforce the same.

3. A toy vehicle frame formed from a sheet metal blank having its rear section shaped to form a seat, a tongue extending forwardly of the sheet, lateral extensions at the juncture of the seat and the tongue adapted, when bent downwardly, to form a pair of guards at each side of the frame, said guards having their lower ends bent horizontally to form foot rests, wheel guards extending from the rear edge of said foot rest and arched upwardly and rearwardly, said seat having its rear edge bent upwardly to form a back rest and arm rests formed by bending the side edges of the back rest forwardly, said arm rests having their lower edges curved complemental with the wheel guard and secured to one edge thereof.

4. A toy vehicle frame formed from a sheet metal blank having its rear section shaped to form a seat, a tongue extending forwardly of the sheet, lateral extensions at the juncture of the seat and the tongue adapted, when bent downwardly, to form a pair of guards at each side of the frame, said guards having their lower ends bent horizontally to form foot rests, wheel guards extending from the rear edge of said foot rest and arched upwardly and rearwardly, said seat having its rear edge bent upwardly to form a back rest and arm rests formed by bending the side edges of the back rest forwardly, said arm rests having their lower edges curved complemental with the wheel guard and secured to one edge thereof, and a brace for the frame of inverted U-shaped formation having its bight portion positioned under the tongue and its legs disposed downwardly at the inner side of said guards, said brace being provided with extensions at the lower ends of the legs and positioned transversely under the foot rest to reinforce the latter.

In testimony whereof I affix my signature.

MAXWELL STEELE FURMAN.